United States Patent [19]
Solomon

[11] 3,922,128
[45] Nov. 25, 1975

[54] APPARATUS FOR EXTRUDING A CONTINUOUS COATING ABOUT A STRAND

[75] Inventor: Nathan L. Solomon, Englewood, N.J.

[73] Assignee: Solo Products Corporation, Englewood, N.J.

[22] Filed: Nov. 11, 1971

[21] Appl. No.: 197,994

Related U.S. Application Data

[63] Continuation of Ser. No. 747,855, July 26, 1968, abandoned.

[52] U.S. Cl. .............. 425/113; 264/174; 425/467
[51] Int. Cl.² ........................................... B29F 3/10
[58] Field of Search ............... 264/4, 5, 54, 174; 425/113, 376, 467

[56] References Cited
UNITED STATES PATENTS

| | | | |
|---|---|---|---|
| 2,185,701 | 1/1940 | Boyle | 118/405 |
| 2,469,999 | 5/1949 | Stober | 425/209 X |
| 2,593,136 | 4/1952 | Gliss | 425/193 |
| 2,656,566 | 10/1953 | Berggren | 425/114 |
| 2,760,230 | 8/1956 | Van Riper | 118/405 |
| 2,766,481 | 10/1956 | Henning | 425/817 |
| 2,928,123 | 3/1960 | Ramsey | 425/113 X |
| 2,943,352 | 7/1960 | Van Riper | 425/380 |
| 2,990,576 | 7/1961 | Van Riper | 425/197 |
| 3,018,516 | 1/1962 | Clinepelter | 425/199 |
| 3,045,281 | 7/1962 | Skobel | 425/113 |
| 3,502,753 | 3/1970 | Rhoads | 264/54 X |
| 3,608,035 | 9/1971 | Frohlich | 425/113 X |

OTHER PUBLICATIONS

Dilley, *Trans. Journal Plastics Institute*, February 1966, pp. 17-21.

Primary Examiner—R. Spencer Annear
Attorney, Agent, or Firm—Howard C. Miskin

[57] ABSTRACT

Apparatus attached to the feed end of an extruder which uniformly diverts the flow of plastic in thin streams at right angles and simultaneously diverges the flow inwardly in separate channels until they join adjacent the die and directed against the strand so as to exert a uniform pressure on the strand. The strand is coated as it passes through and beyond a die opening. The die opening has the dimensions of the outer diameter of the coated strand.

10 Claims, 4 Drawing Figures

U.S. Patent  Nov. 25, 1975  3,922,128
FIG.1
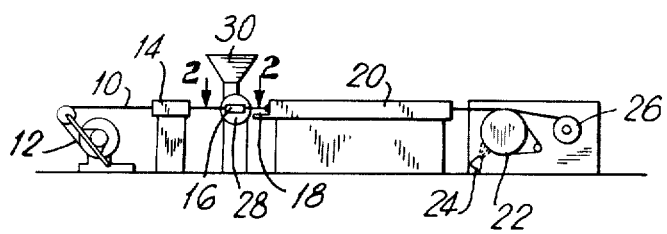
FIG.2
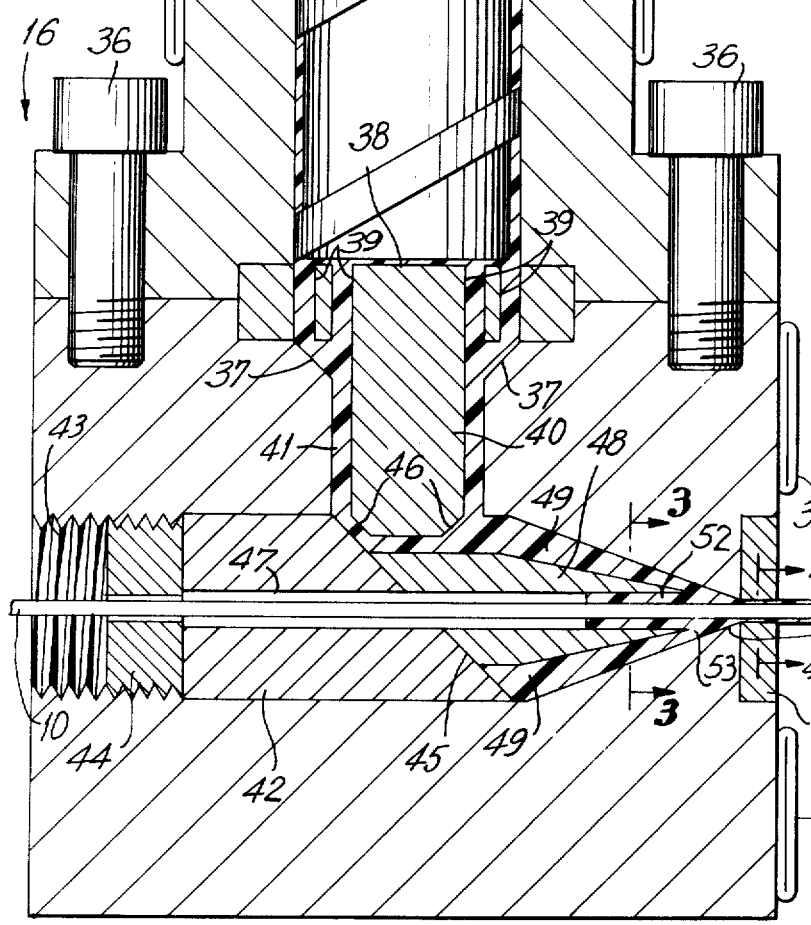
FIG.3
FIG.4
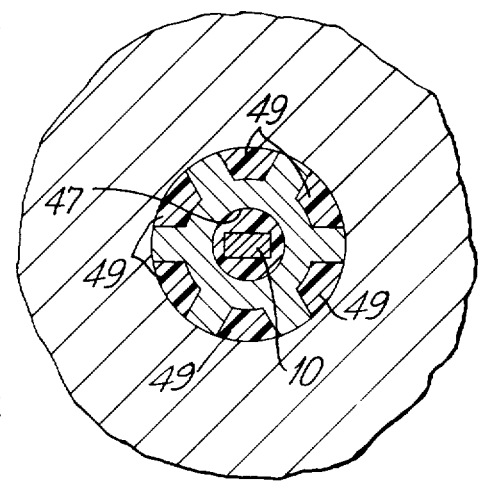
INVENTOR.
NATHAN L. SOLOMON
BY
ATTORNEY

APPARATUS FOR EXTRUDING A CONTINUOUS COATING ABOUT A STRAND

This is a continuation of application Ser. No. 747,855, filed July 26, 1968, now abandoned.

This invention relates to the production of plastic coated strands and more particularly relates to the method and apparatus for applying a uniform, thin, continuous plastic coating to continuous strands and especially strands moving at high speeds and having various cross sectional contours, including rectangular.

It is common to extrude a plastic coating about a wire. However, these coatings necessarily were relatively thick, i.e., over 0.01 inch thick, and generally were not consistently uniform in thickness. Further, using prior art coating equipment, it was difficult to apply even these relatively thick coatings to strands with non-uniform cross sections, such as other than circles, moving at high lineal speeds. Thick plastic coating applied to the wire are not normally securely bonded to the wire, so that any undue flexing often separated the coating from the wire substrate. While this would normally not be a problem for cables or where the wire is not often flexed, it prevented use of such coating strands for bobby pins and similar items, which are often flexed and bent.

Therefore, it is an object of the present invention to provide an improved method of continuously coating strands by extrusion with a uniform thin coating of plastic material.

A further object of the present invention is to provide an improved cross head construction for attachment to an extruder for continuously coating strands of various cross sections with a uniform, thin, rigid plastic coating moving at high lineal speeds.

A still further object of the present invention is to provide an apparatus that will apply a uniform, thin, rigid plastic coating to a continuous strand of material with no guides for the strand other than uniform pressure of the plastic material which is to be coated, and which coating securely adheres to the strand during flexing, or later fabrication.

Still another object of the present invention is to provide a method for producing a plastic coated strand that accomplishes all of the above and yet is inexpensive to fabricate, efficient in operation, and easy to control.

Other objects and features of the invention will be apparent when the following description is considered in connection with the annexed drawings, in which:

FIG. 1 is a diagrammatic side elevational view showing a complete layout for coating in accordance with the present invention;

FIG. 2 is an enlarged fragmentary cross-sectional view taken along line 2—2 of FIG. 1;

FIG. 3 is an enlarged cross-sectional view taken along line 3—3 of FIG. 2; and

FIG. 4 is an enlarged cross-sectional view taken along line 4—4 of FIG. 2.

Referring in detail to FIG. 1, a typical wire coating line is illustrated schematically. The continuous element to be extrusion-coated could be a filament, strip, wire or strand of the desired cross-sectional configuration, and is hereinafter referred to as a strand, and the same is shown as a flat-rolled wire 10, generally rectangular in cross section, leaving a pay-off 12 and being preheated at 14. Preheater 14 could be of any standard type. Preheating is advantageous in two ways; the strand is dried and cleaned and the heated strand avoids too great a cooling effect on the molten polymer, with which it is to be coated. From preheater 14, strand 10 passes into an extruder head 16, where the coating is applied. As coated strip 10 exits the die portion of head 16, it passes through a short air gap 18 into a trough 20, in which water is circulated to accelerate cooling of the coated strand as it travels the length of the trough. The coated strand 10 passes around a capstan 22, which is used essentially to remove water remaining from trough 20. An air blower 24 aids in removing excess water and in drying the wire passing around capstan 22. From capstan 22 the coated strand is fed into a windup 26 where the strand is wound on a reel, which is removed when filled.

The plastic resin used is supplied to extruder 28 via a hopper 30 and conveyed forward by rotational movement of a screw 32, as shown in FIG. 2, or a plunger, not shown. As the resin moves forward in the extruder, it is plasticized by heat externally applied to the extruder barrel, such as heaters 34 and heat generated internally by working or shearing of the resin by the screw 32.

Referring to FIG. 2, extruder head 16 is attached to the end of the extruder, such as by bolts 36. Mounted in head 16 adjacent the end of the barrel of the extruder is breaker plate 38 having a series of parallel holes or passageways 39 there-through at right angles to its surface. The passageways convert the helical movement of the plastic to longitudinal flow. Affixed generally coaxially to breaker plate 38 is an extension or core member 40 extending into extruder head 16, which forms a cavity thereabout, indicated at 41. Extension 40 has an outer envelope with respect to the cavity wall to maintain a thin cross section of material flow to provide uniform heat of the plastic as it moves forward towards the die, and prevent any plastic from becoming stagnant.

The outer diameter of cavity 41 is generally smaller than the diameter of outer passageways 39 of breaker plate 38. The flow of plastic from these outer passageways is directed inwardly toward cavity 41 by slanted walls 37 of head 16.

Extending into head 16 from one end is an opening 43 spaced from breaker plate 38 and extending transversely to the axis of extruder 28 and terminating in a tapered conical female surface 53. Coaxial to opening 43 and conical surface 53, and passing through head 16, is a strand receiving passageway 47a. Opening 43 intersects and communicates with cavity 41. Concentrically disposed within opening 43 is a finger 48 having a tapered surface mating with conical surface 53. The tapered portion of finger 48 abuts surface 53 and the outer periphery of the conical surface has a plurality of spaced longitudinally extending flutes or passageways 49. As seen best in FIG. 2, passageways 49 have a tapered depth, uniformly decreasing in depth, with the greatest depth being closest to cavity 41. Axially disposed within finger 48 is a strand receiving passageway 47 axially aligned with passageway 47a in head 16. Abutting the non-tapered end of finger 48 is a plug 42 received within opening 43. Plug 42 has a slanted surface 45, which mates with a corresponding slanted surface of finger 48. Finger 48 is of a length so that surface 45 intersects the plastic flow from cavity 41. Plug 42 is forced against finger 48 by a back guide 44, which is threadedly received within opening 43. Back guide 44 and plug 42 each have strand receiving passageways 47 therein axially aligned with corresponding passageways 47 in finger 48 and passageway 47a in head 16. Passageways 47 and 47a are larger in diameter than the strand 10. Surface 45 is about 45° to the axis of plastic flow from cavvity 41 and which when intercepting the plastic smoothly diverts the plastic flow substantially 90° in the direction of strand movement, indicated in FIG. 2, from left to right. Extending into opening 43 adjacent surface 45 and finger 48 is the end of extension 40, which end has beveled edges at 46. Flutes 49 communicate with cavity 41 and passageway 47a through head 16 and control and divert the direction of pressure of the plastic coating material to the point of extrusion. As shown in FIG. 3, flutes or passageways 49 are the only paths for the flow of plastic material from cavity 41 to passageway 47a. This restricted controlled flow restricts swirling and provides uniform annular pressure and flow about the strand to be coated. The greater depth of flutes 49 at the exit of cavity 41 insures passageways 49 receiving all of the plastic material therefrom to prevent stagnation of material. Mounted on the end of extrusion head 16 is a die insert 50. Insert 50 has a die opening 54 pre-centered with passageway 47a and the center line of strand 10. As shown best in FIGS. 3 and 4, the die opening 54 is rectangular and is precision made to be a predetermined amount larger than the strand to be coated, so as to carefully control the thickness of the coating material to be applied. Strand 10 enters passageway 47 via back guide 44 and passes through finger 48 into the plastic adjacent die insert 50 and out through die opening 54. The draw down ratio is 1/1, so that die opening 54 is equal to the desired final outside diameter of the coated strand. Speed up of strand 10 would not change the thickness of the coating applied which is fixed by the size of the die opening. Advantageously, head 16 is heated, such as indicated by heaters 34, so as to provide heat to the plastic.

The pressure of the plasticized mix flowing from flutes 49 controls the centering of the strand 10 through die opening 54, and forces plastic material back into passageway 47. The length of the back flow of this plastic, indicated at 52, depends on the pressure of the extruder and the speed of the strand. The strand passing through the viscous plastic causes the portion of the plastic nearest to it to reverse its direction, which force is progressively reduced as the radial distance increases. No guide tips, self-centering die or pre-centered dies are used or needed and strand 10 passes through the plastic contained within head 16 and through die opening 54 without touching any metal or rigid surface. As strand 10 is drawn through the plastic material within passageway 47 and converging walls 53, the plastic material tends to adhere to strand 10, and thereby strand 10 draws the coating material through the throat of head 16 and die opening 54. The pressure of the material in passageway 47 aids in providing good adhesion between the plastic and the strand 10.

A satisfactory die land length or thickness of the die for a rectangular shaped cross-sectional strand having dimensions of about 1/16 inch × 3/64 inch, has been found to be about 9/64 inch and was used to produce satisfactory coated strands.

Employing the method and apparatus of the present invention provides a uniform continuous thin coating on a strand having dimensions of 0.022 × 0.055 inches and which coating falls within the range of about 0.001 to about 0.00055 inches on a side and which controls closely the outer dimensions of the coated strand of any cross-sectional configuration, even at lineal speeds of 1000 feet per minute. The thin coating is securely bonded to the strand so that it will not separate when the strand is flexed or later fabricated. The thickness does not vary more than 10%.

While the flutes 49 were shown being on finger 48, they could be positioned about female surface 53 and the surface of finger 48 could be smooth. Also, while conical surface 53 was shown as part of head 16, it could be a separate surface and mounted within opening 43 in head 16 in any convenient manner. Further, if strand 10 were not at right angles to extruder 28, the angle of surface 45 would vary so as to direct the flow of plastic in the direction of movement of the strand.

Any extrudable material usable as coatings may be applied, such as those commonly used in extrusion coating, such as nylon, butyrate, polyethylene, polypropylene, and vinyl resins. Generally speaking, the coating material may be any of the various materials known as plastics, and which includes synthetic resins, natural and synthetic plastics, cellulose and its derivatives, protein substances, polymeric petroleum derivatives, and the like. Various combinations of these materials may be used for the purpose of regulating resiliency, stiffness, bacteria growth, fungus growth, waterproofness, electrical properties, elasticity, softening points and sheer strength. While many of the materials disclosed and which are chemically incompatible with one another, are mechanically miscible to form a homogeneous mass, so that they may be mixed together to provide the various characteristics desired.

While preferred embodiments have been described, it is understood that many variations thereof will be readily apparent to those skilled in the art without departing from the spirit thereof. Therefore, it is intended that the foregoing description shall be deemed illustrative only and not construed in a limiting sense, the present invention being defined solely by the appended claims.

What I claim is:

1. Apparatus for extruding a coating of plastic material about a moving strand, comprising a die head assembly which receives the plastic material, said head having a first cavity which receives and discharges said plastic material, a generally longitudinally extending core member coaxially extending into the first cavity for substantially its entire length and spaced generally uniformly about its periphery from the surrounding walls of the cavity, for defining the passageway for the flow of plastic material between the walls of the first cavity and the outer peripheral surface of the core, said passageway having a relatively thin depth so as to maintain a thin cross-section of material flow, a wall disposed at an angle to the axis of said first cavity and interrupting the flow of material from the first cavity and diverting the flow into the direction of strand movement, a finger extending from said wall with its longitudinal axis substantially aligned with the axis of said strand and having a generally conical portion, said finger being received within a mating cavity defined by tapered walls, the surface of said finger abutting the walls of said cavity and said tapered walls surrounding a strand discharge opening, a plurality of spaced separate passageways defined by said finger and said tapered walls and communicating with said first cavity and the strand discharge opening, and a die mounted on said head and positioned coaxially to said discharge opening.

2. Apparatus as in claim 1, wherein said slanted wall is positioned about 45° to the axis of plastic flow from said cavity for diverting the plastic flow about 90°.

3. Apparatus as in claim 2, wherein said slanted wall is part of a plug slideably positioned within an opening extending into said head from one end, said slanted wall cooperating with a mating wall of said finger, said plug and said finger having strand receiving openings axially aligned through which said strand passes.

4. Apparatus as in claim 1, wherein said finger has a plurality of longitudinally extending flutes about its periphery forming said spaced passageways, said flutes varying uniformly in depth with the greater depth being adjacent the exit of the first cavity.

5. Apparatus as in claim 1, wherein said finger has a strand receiving passageway coaxially passing therethrough and axially aligned and communicating with the strand discharge opening.

6. Apparatus as in claim 1, wherein said passageways vary in depth with the greater depth being adjacent the discharge of said first cavity.

7. Apparatus for extruding a thin uniform coating of plastic material about a moving strand, comprising a die head assembly which receives the plastic material, said head having a first cavity with an entrance which receives said plastic material and an exit from which the plastic material leaves, a wall adjacent the exit of said first cavity disposed at an angle to the axis of said first cavity and interrupting said flow of material and diverting the flow into the direction of strand movement, a finger abutting said wall with its longitudinal axis substantially aligned with the axis of said strand and having a generally conical portion, said finger being received within a second cavity defined by a tapered wall, the surface of said finger engaging the wall of said second cavity, said second cavity wall surrounding a strand discharge opening, a plurality of spaced separate passageways defined by said finger and said tapered wall of said second cavity and communicating with said first cavity and the strand discharge opening, said passageways providing the only path for the flow of plastic material between said first cavity and said strand discharge opening, said finger having a strand receiving passageway coaxially passing therethrough and axially aligned and communicating with the strand discharge opening, the plastic material leaving the spaced passageways at the strand discharge opening being at a pressure to force plastic material to flow back into said strand receiving passageway a predetermined distance responsive to the pressure of the plastic material and the lineal speed of the strand, and a die mounted on said head and positioned coaxially to said discharge opening.

8. Apparatus for extruding a thin uniform coating of plastic material about a moving strand, comprising a die head assembly which receives the plastic material, said head having a first cavity with an entrance which receives said plastic material and an exit from which the plastic material leaves, a first wall disposed at an angle to the longitudinal axis of said first cavity and interrupting said flow of material and diverting the flow into the direction of strand movement, said wall having a portion contiguous to said first cavity, a finger abutting said first wall with its longitudinal axis substantially aligned with the axis of said strand and having a generally conical portion, said conical portion of said finger being received within a second cavity defined by a tapered wall, the first cavity and said first wall, the finger conical portion engaging the tapered wall of said second cavity, said tapered second cavity wall surrounding a strand discharge opening, a plurality of spaced separate passageways defined by said finger and said tapered wall of said second cavity and communicating with said first cavity and the strand discharge opening, the other end of said first wall being contiguous to one end of certain of said passageways, the corresponding end of the other of said passageways being contiguous to the exit of said first cavity, said passageways providing the only path for the flow of plastic material between said first cavity and said strand discharge opening, said passageways varying uniformly in depth, with the greater depth being adjacent the exit of the first cavity, and a die mounted on said head and positioned coaxially to said discharge opening.

9. Apparatus as in claim 8 wherein said passageways are equally spaced about the periphery of said finger.

10. Apparatus as in claim 8 further including a core member extending into the first cavity and spaced generally uniformly about its periphery from the surrounding walls of the first cavity.

* * * * *